United States Patent
Götz et al.

(10) Patent No.: US 11,323,380 B2
(45) Date of Patent: May 3, 2022

(54) METHOD OF SYNCHRONIZATION OF DATA PACKET TRANSMISSION

(71) Applicant: SIEMENS AKTIENGESELLSCHAFT, Munich (DE)

(72) Inventors: Franz-Josef Götz, Heideck (DE); An Ninh Nguyen, Nuremberg (DE); Jürgen Schmitt, Fürth (DE); Feng Chen, Feucht (DE); Marcel Kießling, Velden (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/640,436

(22) PCT Filed: Aug. 1, 2018

(86) PCT No.: PCT/EP2018/070834
§ 371 (c)(1),
(2) Date: Feb. 20, 2020

(87) PCT Pub. No.: WO2019/042688
PCT Pub. Date: Mar. 7, 2019

(65) Prior Publication Data
US 2020/0213240 A1    Jul. 2, 2020

(30) Foreign Application Priority Data
Aug. 29, 2017   (EP) .................................... 17188345

(51) Int. Cl.
*H04L 12/841*   (2013.01)
*H04L 12/865*   (2013.01)
(Continued)

(52) U.S. Cl.
CPC ................ *H04L 47/28* (2013.01); *H04L 7/02* (2013.01); *H04L 47/6275* (2013.01)

(58) Field of Classification Search
None
See application file for complete search history.

(56) References Cited

U.S. PATENT DOCUMENTS

| 2004/0202191 A1 | 10/2004 | Vrabel |
| 2011/0299681 A1* | 12/2011 | Kubota ................ H04L 1/1607 380/247 |

(Continued)

FOREIGN PATENT DOCUMENTS

| EP | 1705839 A1 | 9/2006 |
| EP | 2453613 A1 | 5/2012 |
| EP | 3057273 A1 | 8/2016 |

OTHER PUBLICATIONS

European Search Report for European Patent Application No. 17188345.7-1219 dated Feb. 8, 2018.
(Continued)

*Primary Examiner* — Peter Chen
*Assistant Examiner* — Jeff Banthrongsack
(74) *Attorney, Agent, or Firm* — Lempia Summerfield Katz LLC

(57) ABSTRACT

The present disclosure concerns a method of synchronization of data packet transmission (P1, P2, P3) in a network (N), including and/or initiating the acts of: Receiving (S1), e.g. from a terminal device (T1, T2, T3) of the network (N), one or more data packets (P1, P2, P3) after a threshold time interval (tt) of a periodic transmission window (RT, BE), wherein the threshold time interval (tt) is arranged at the beginning of said periodic transmission window (RT, BE), and Forwarding (S2) the data packet (P1, P2, P3) in a subsequent transmission window (RT, BE), preferably directly after the transmission window in which the data (Continued)

packet (P1, P2, P3) was received, within the threshold time interval (tt) of the transmission window (RT, BE).

18 Claims, 14 Drawing Sheets

(51) Int. Cl.
  *H04L 7/02* (2006.01)
  *H04L 47/28* (2022.01)
  *H04L 47/6275* (2022.01)

(56) References Cited

U.S. PATENT DOCUMENTS

| | | | |
|---|---|---|---|
| 2014/0071823 A1* | 3/2014 | Pannell | H04L 47/50 370/230.1 |
| 2015/0256356 A1 | 9/2015 | Armbruster | |
| 2016/0073340 A1* | 3/2016 | Xue | H04W 74/0816 455/522 |

OTHER PUBLICATIONS

PCT International Search Report, Preliminary Report, and Written Opinion of International Searching Authority dated Aug. 14, 2019 corresponding to PCT International Application No. PCT/EP2018/070834 filed Aug. 1, 2018.

\* cited by examiner

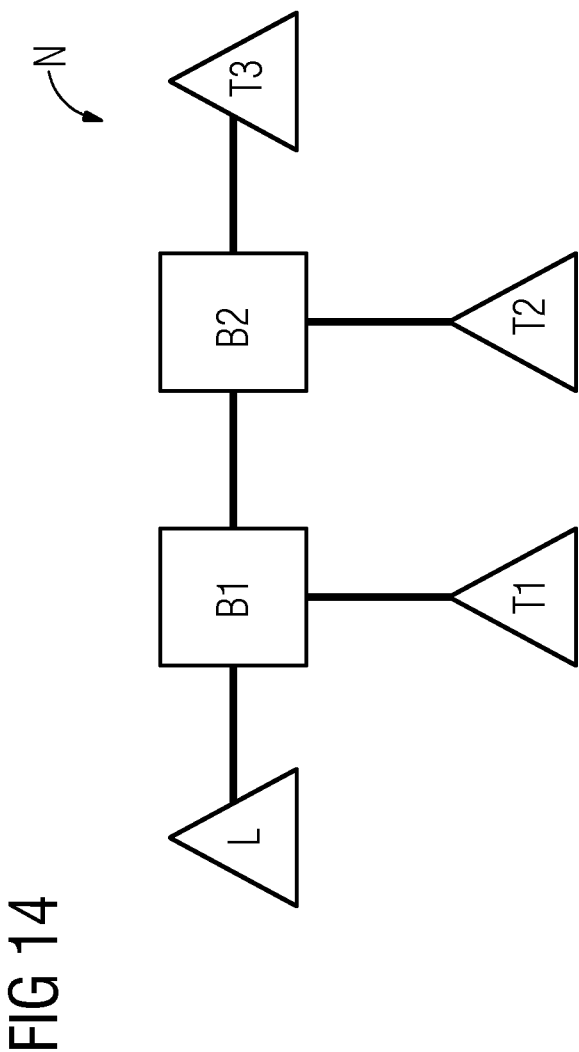

FIG 23

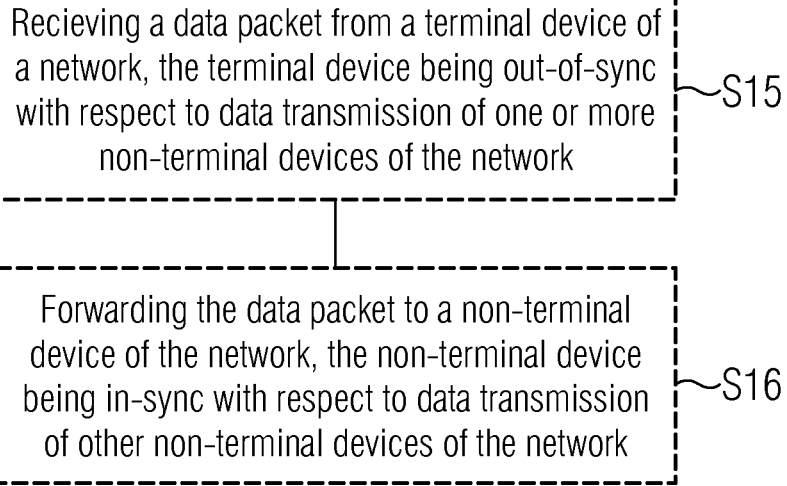

Recieving a data packet from a terminal device of a network, the terminal device being out-of-sync with respect to data transmission of one or more non-terminal devices of the network — S15

Forwarding the data packet to a non-terminal device of the network, the non-terminal device being in-sync with respect to data transmission of other non-terminal devices of the network — S16

FIG 24

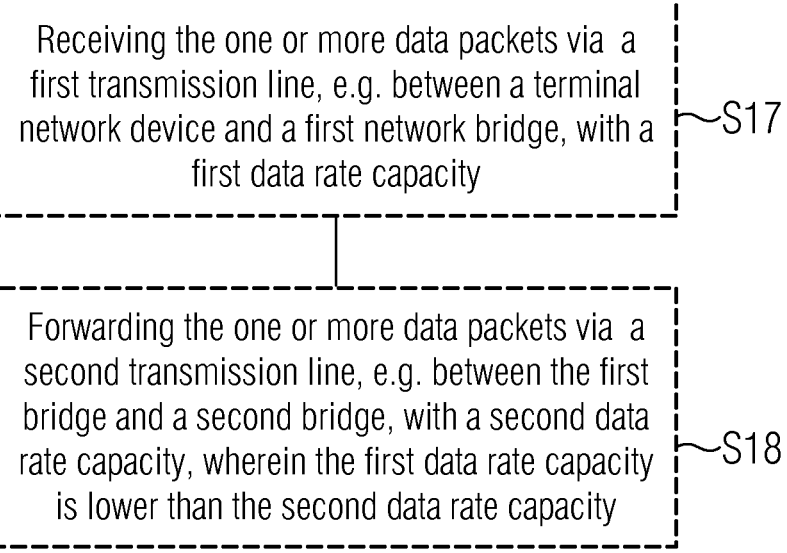

Receiving the one or more data packets via a first transmission line, e.g. between a terminal network device and a first network bridge, with a first data rate capacity — S17

Forwarding the one or more data packets via a second transmission line, e.g. between the first bridge and a second bridge, with a second data rate capacity, wherein the first data rate capacity is lower than the second data rate capacity — S18

FIG 25

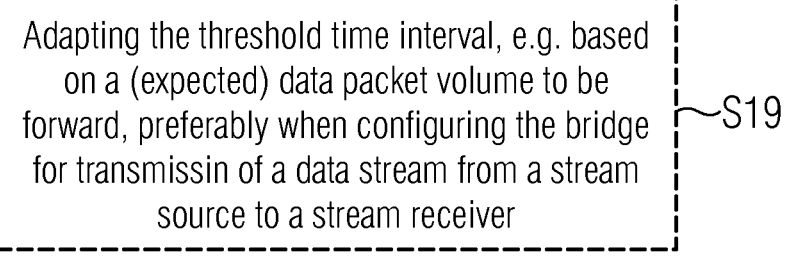

Adapting the threshold time interval, e.g. based on a (expected) data packet volume to be forward, preferably when configuring the bridge for transmissin of a data stream from a stream source to a stream receiver — S19

METHOD OF SYNCHRONIZATION OF DATA PACKET TRANSMISSION

RELATED CASE

The present patent document is a § 371 nationalization of PCT Application Serial Number PCT/EP2018/070834, filed Aug. 1, 2018, and also claims the benefit of EP Application Serial No. 17188345, filed Aug. 29, 2017, which are hereby incorporated by reference.

FIELD

The present embodiments relate to a method, a network bridge and to an industrial communication network.

BACKGROUND

Local area networks (LANs) are routinely deployed for providing network connectivity among stations confined to a limited area. A LAN typically enables connected stations to transmit data packets called frames. Usually, such a frame will include an address identifying the receiving station or destination. The data transmission is mostly based on the Ethernet or IEEE 802.3 protocol. To extend the range of such networks, layer 2 switches (bridges) are commonly used. In addition to layer 1 functions (signal amplification, forwarding), a bridge may extract address information so as to filter traffic.

The Institute of Electrical and Electronics Engineers (IEEE) came up with a standard (IEEE 802.1Q) defining the operation of layer 2 VLAN bridges that permit the definition, operation and administration of virtual LAN topologies within a bridged LAN infrastructure. Within the IEEE 802.1Q concept, spanning tree algorithms are employed to provide for loop-free transmission of data. As LANs should be enabled to service different types of traffic there is a need to enhance bridges with means to differentiate between different service classes of traffic. A suitable way to define traffic types or service classes is to provide for identifiers or labels in frame headers that govern the treatment by individual bridges.

While service classes give rise to priority-based processing of data frames, there is no guarantee that service quality remains within set or fixed bounds, because an overload of high-priority traffic or link failures can lead to service degradation. Hence, to provide for guaranteed quality of service, one has to go beyond mere classification of frames. Therefore, it has been proposed to add traffic policing at service edge points. Data thresholds can be used to put a limit to the amount of traffic entering a network. The quality of service (QoS) crucially depends on the availability of bandwidth to transport high priority traffic. Hence, the efficiency of traffic policing relies on whether suitable mechanisms can be found to control the load of the network links via suitably chosen traffic policing parameters. For example, in patent application publication EP 1705839 A1, it is proposed to provide for flexible and reliable bandwidth guaranteed services across Ethernet bridged networks.

Furthermore, from patent application publication US 20150256356 A1, methods are known that are based on synchronized communication among the network nodes. In that case, particular time slots are defined for the data interchange between prescribed communication partners. Such time slot methods require sophisticated synchronization and special hardware devices.

Especially in case of unsynchronized data packet transmission, e.g. due to faulty devices or due to a slow data rate capacity between stations of the network, traffic type requirements, e.g. QoS or real-time requirements, may be violated.

SUMMARY

It is thus an object one or more of the present embodiments to provide a mechanism for integration of unsynchronized stations and to mitigate detrimental effects of unsynchronized data packet transmission.

According to a first aspect, a method of synchronization of data packet transmission in a network is proposed. The method may include and/or initiate the act of: receiving, e.g. from a terminal device of the network, one or more data packets after a threshold time interval of a periodic transmission window, wherein the threshold time interval is arranged at the beginning of said periodic transmission window. The method may further include and/or initiate the act of: forwarding the data packet in a subsequent transmission window, preferably directly after the transmission window in which the data packet was received, within the threshold time interval of the transmission window.

According to a second aspect, a network bridge, preferably for an industrial application, such as an automation system, is proposed. The network bridge is operative to perform the method acts of the first aspect.

According to a third aspect, an industrial communication network includes a network bridge according to the second aspect.

BRIEF DESCRIPTION OF THE DRAWINGS

The present embodiments are described in more detail based on the following figures:

FIG. 14 shows a schematic representation of another exemplary network,

FIG. 23 shows exemplary method acts according to a seventh embodiment, FIG. 24 shows exemplary method acts according to an eighth embodiment, FIG. 25 shows exemplary method acts according to a ninth embodiment.

DETAILED DESCRIPTION

Figure 1:
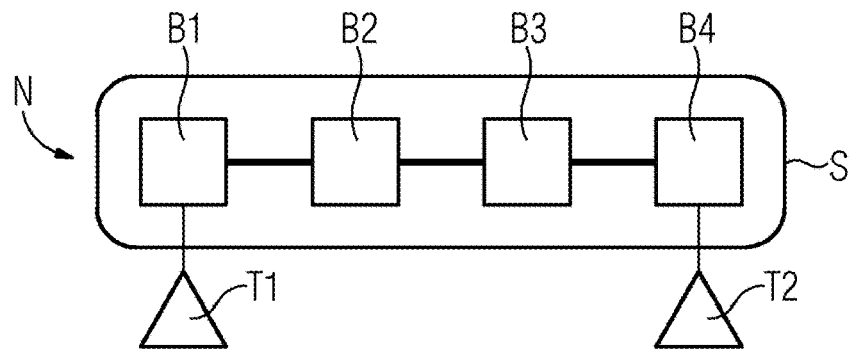
FIG. 1 shows a schematic representation of a network with a first network topology, according to one embodiment.

FIG. 1 shows a network N with a line topology, that is to say, the network stations B1, B2, B3, B4 are connected in a line. The edge stations B1, B4 of the network are also connected to terminal devices T1, T2 of the network N. Network stations B1, B2, B3, B4 are connected via transmission lines via which data packet transmission and/or reception is possible. Network stations B1, . . . , B4 may transmit and/or receive data packets in a synchronized manner via the transmission lines. This synchronized part S of the network N is surrounded by a line denoted S. The terminal devices T1, T2 are not necessarily in-sync with the synchronized part S of the network N with respect to data packet transmission and/or reception.

Figure 2:
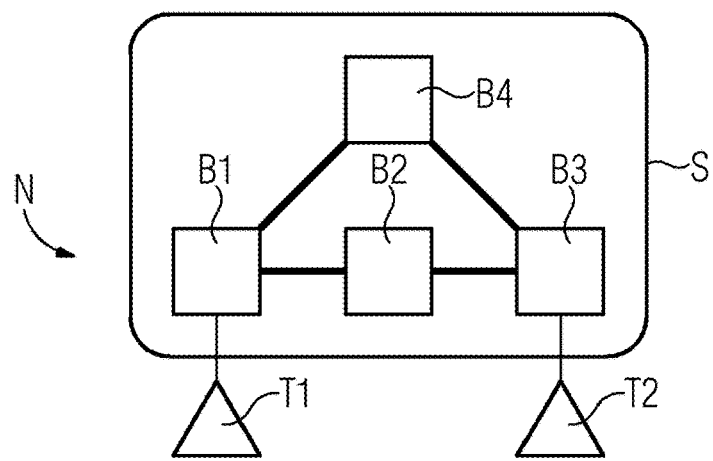
FIG. 2 shows a schematic representation of a network with a second network topology, according to another embodiment.

FIG. 2 shows network N with a ring topology, i.e. network stations B1, B2, B3, B4 are connected in a circle. In this case, the edge stations B1, B3 of the network N are also connected to terminal devices T1, T2 of the network N. Network stations B1, B2, B3, B4 are connected via transmission lines via which data packet transmission and/or reception is possible. Network stations B1, . . . , B4 may transmit and/or receive data packets in a synchronized manner via the connection lines, this synchronized part S of the network N is surrounded by a line denoted S, whereas the terminal stations are not necessarily in-sync with the synchronized part S of the network N with respect to data packet transmission and/or reception.

Thus, in general a network N may exist that includes a synchronized network part S in which data packet transmission and reception occurs in a synchronized manner, e.g. within predefined time intervals with fixed starting and ending points in time with respect to a reference clock, whereas other parts of the network N (one or more stations, such as terminal devices T1, T2) are not in-sync with this synchronized part S. As mentioned above, this out-of-sync data packet transmission may occur due to different data rate capacity of the transmission lines or due to the use of low cost devices without the capability to synchronize the transmission and/or reception of data packets. Transmission lines may be wired but may as well include wireless transmission lines, e.g. data packets may be transmitted and/or received via radio communication. Preferably transmission and/or reception in a network N takes place via Ethernet and/or according to the IEEE 802.3 protocol as mentioned above.

Figure 3:
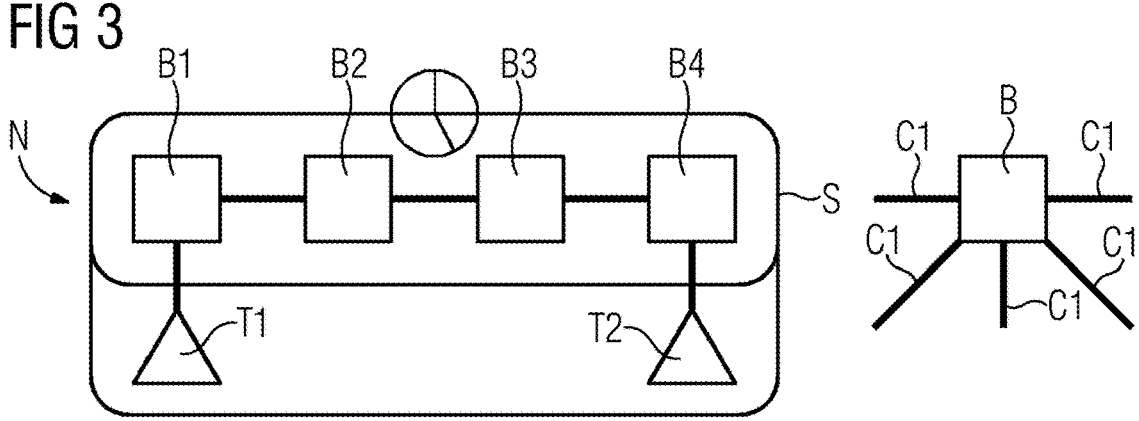
FIG. 3 shows a schematic representation of network in which all stations are synchronized, according to one embodiment.

Now turning to FIG. 3, another network N with line topology is shown. All stations in the network N are connected to each other via the same type of transmission lines C1. That is to say, the transmission lines C1 of the network N are of the same type, in particular with respect to data rate capacity. Thus, the same amount of data may be transmitted and/or received independent of the respective transmission path. Hence, no bottlenecks exist with respect to data rate capacity. FIG. 3 also includes an exemplary bridge B having multiple ports, each of which is connected to a transmission line C1 having the same data rate capacity.

Figure 4:
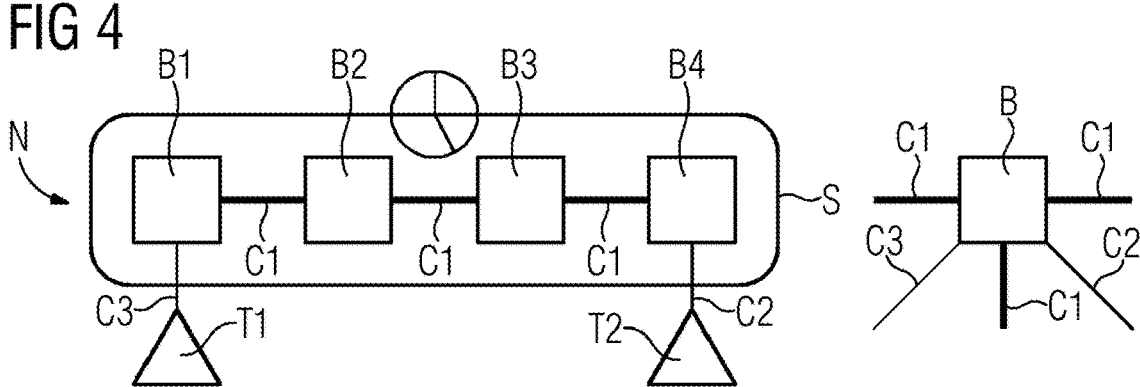
FIG. 4 shows a schematic representation of a network with unsynchronized terminal stations, according to one embodiment.

In FIG. 4 however different types of transmission lines C1, C2, C3 exist in the network N via which data packets are transmitted and/or received in the network N. For example, terminal device T1 is connected to a bridge B1 via transmission line C3, which may have a lower data rate capacity than, for example, transmission line C1 via which bridge B1 is connected to bridge B2. Further types of transmission lines, e.g. C2, may exist with still a different data rate capacity than the data rate capacity of transmission lines C3 and C1. FIG. 4 also includes an exemplary bridge B having multiple ports, in this case however, the different ports of the bridge B are connected to transmission lines C1, C2, C3, respectively, and the different transmission lines possess different data rate capacities. Data rate capacity may be defined as a maximum data rate achievable via a transmission line.

As described in connection with FIGS. 1 and 2 the networks N as shown in FIGS. 3 and 4 may by synchronized or may include one or more parts that are synchronized and may further include one or more parts that are not in-sync with the synchronized part(s). The synchronized parts of the network N in FIGS. 3 and 4 are indicated by a symbolic reference clock and are surrounded by circled line S.

Some applications, in particular in the industrial realm, have a need for data packet delivery that is highly predictable in terms of the time at which the data packet transmission and/or reception will occur and in terms of the overall latency and jitter that will be experienced as one or more data packets are delivered from their source to their destination. Thus in an industrial application, where data is transmitted, an industrial (Ethernet) network may be used to transmit information relating to the application, e.g. critical data, in one or more data packets. In such a system one or more data packets carrying information, such as e.g. control information, are transmitted on a repeating time schedule. Late delivery of such data packets can result in instability, inaccuracy, or failure of the operation of the control loops concerned. Additionally, the need has arisen to mix time-critical traffic with other types of traffic in the same network. Prioritization alone is insufficient to address the needs of this kind of traffic; if a low priority data packet is already being transmitted, then that transmission may complete before a higher priority data packet or frame can access the transmission medium, thus resulting in a high latency and/or delay. In IEEE Std 802.1Qbv-2015, it is proposed to introduce protected transmission windows, cf. FIG Q-1 of IEEE Std 802.1Qbv-2015. These windows may be created by the operation of so called transmission gates that control the transmission and/or reception of data packets via a port, e.g. of a network bridge. Gates may be open or closed and gate operation can be controlled by a list providing the state of the gate at a given time. Exemplary operation of multiple gates in order to provide for the above mentioned protected transmission windows is depicted in FIG Q-2 of IEEE Std 802.1Qbv-2015.

Figure 5:
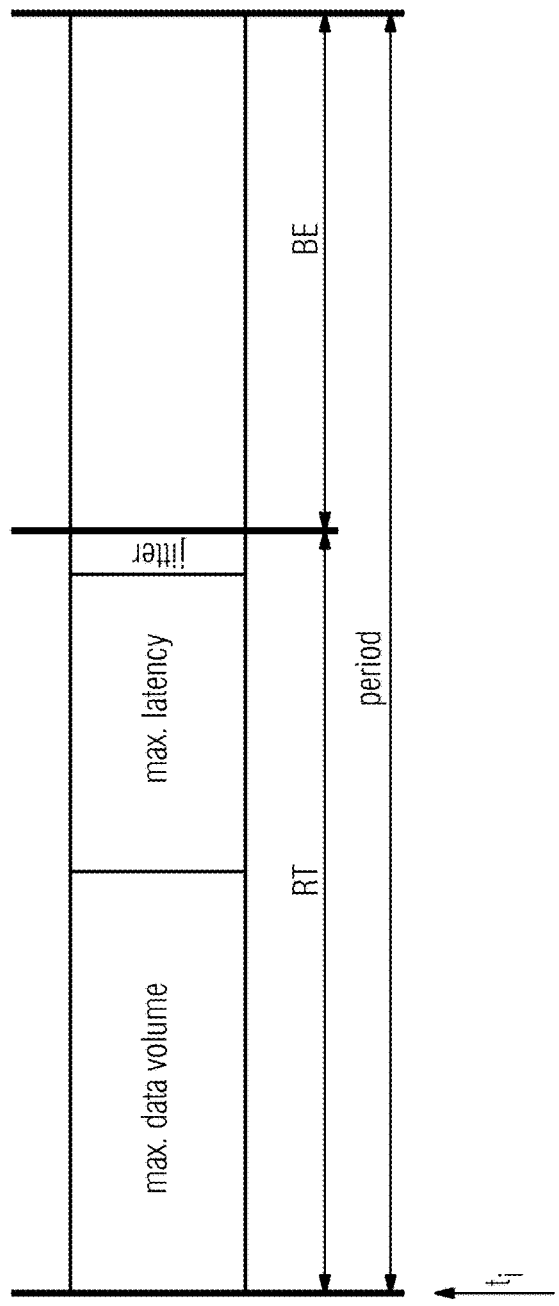
FIG. 5 shows a schematic representation of a first embodiment of a time schedule for data packet transmission.

Turning to FIG. 5, an exemplary time schedule for data packet transmission in a (at least in part synchronized) network N is shown. The time schedule shown is periodic and repeats itself after each period. The time schedule shown further includes two transmission windows, indicated by RT and BE. However, time schedules with more than two transmission windows are possible. The respective transmission windows RT, BE may be dedicated to different traffic types, i.e. to data packets belonging to different traffic types. In the example of FIG. 5, the first transmission window, denoted as RT, is dedicated to transmission of real-time-traffic, whereas the second transmission window, denoted as BE, is dedicated to best-effort traffic. As sown in FIG. 5, the transmission windows are directly adjacent to another. However, some back-off (in time) may be provided between the transmission windows.

The length of the transmission windows RT, BE may be chosen in accordance with different aspects of network properties, such as network size, e.g. the number of hops a data packet has to perform in order to travel from its source to its destination in the network, or the data packet volume that is to be transmitted via the network. Thus the RT-transmission window may be chosen according to a maximum data volume to be transmitted during a transmission window and/or according to the maximum latency that occurs when data packets, e.g. of the maximum data volume are to be transmitted. Further, jitter, i.e. the respective deviation to a reference clock, may be considered when determining the length of a transmission window, in particular the length of the RT-transmission-window.

Ideally, especially in the case of a terminal network device T1, T2, the one or more data packets should be transmitted at the beginning of a transmission window so as to allow the one or more data packets P1, P2, P3 to complete their way through the network N within the transmission window RT, BE. That is to say, initial injection, e.g. at time ti of one or more data packets should occur at the beginning of a transmission window. For a data packet of a specific traffic type, a respective transmission window is chosen. For real-time traffic, a real-time traffic transmission window is chosen and/or for best effort traffic a best effort traffic transmission window is chosen. Now, if a data packet is to perform a certain number of hops in the network, e.g. via one or more bridges, forwarding or relaying of the data packet does not occur at the beginning of a respective transmission window but rather at a certain point in time after the beginning of the transmission window. The transmission window is, as already explained, conFIGd in such a way as to allow the data packet transmission to be completed within the respective transmission window.

Figure 6:
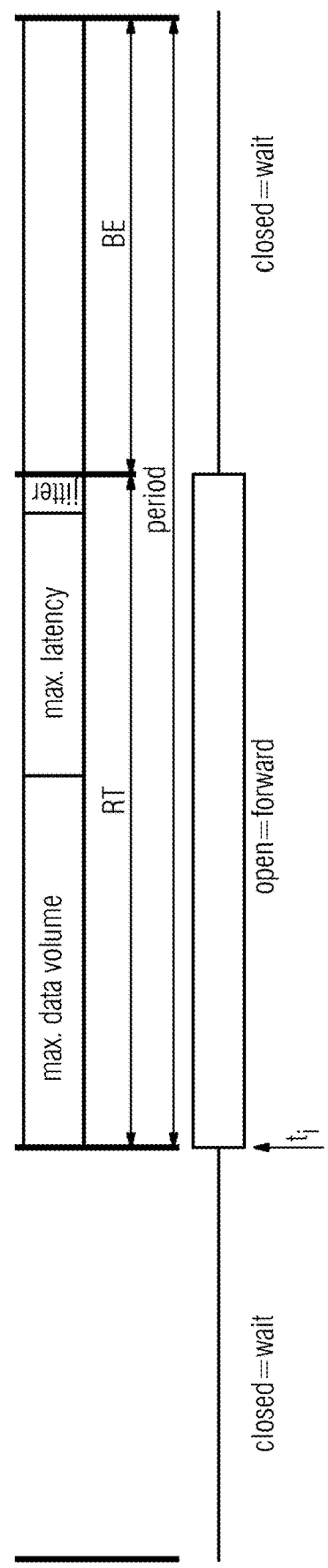
FIG. 6 shows a schematic representation of a second embodiment of a time schedule for data packet transmission.

As can be seen from FIG. 6, if a transmission window, that is, the respective gate that controls data packet reception and or transmission, is closed, a data packet will not be transmitted or forwarded by the respective network station, e.g. a network bridge. This time period is indicated in FIG. 6 by "closed=wait". Transmission of the data packet is thus delayed until the transmission window, or its respective gate, is opened. Then transmission of one or more data packets may occur in the way described in the above. This time period is indicated by "open=forward" in FIG. 6. When the transmission window closes again, e.g. because another transmission window opens, data packets of the traffic type belonging to said transmission window are delayed again. This time period is indicated again in FIG. 6 by "closed=wait". During this time period data packet transmission of data packets of a different traffic type may occur. For example, each traffic type and/or respective data packet queue may have a gate assigned to it. In the exemplary embodiment of FIG. 6, best-effort traffic may be transmitted in the "closed=wait" time period.

Figure 7:
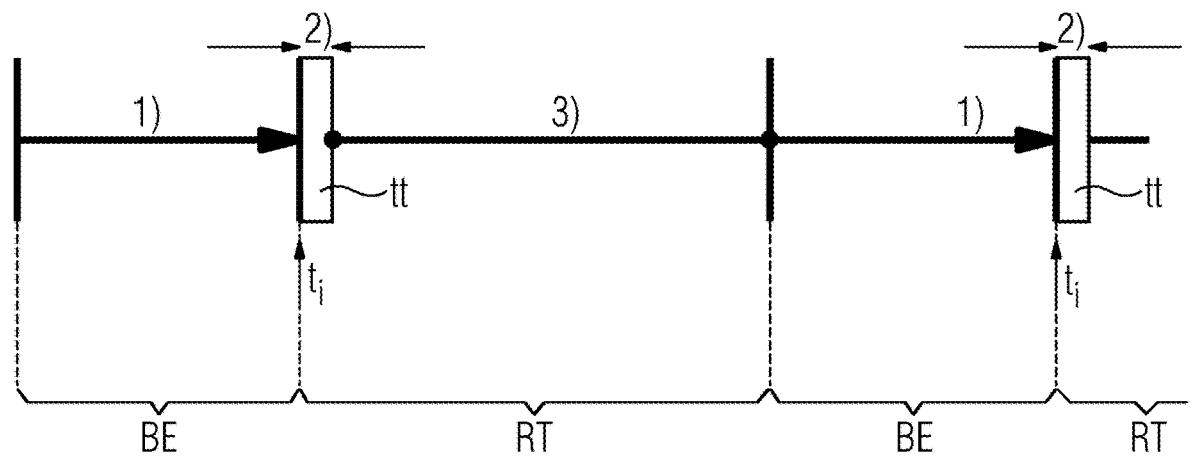
FIG. 7 shows a schematic representation of a third embodiment of a time schedule for data packet transmission.

The mechanism described in FIG. 6 is now described again relating to FIG. 7. During a first period of time, indicated by 1) in FIG. 7, transmission of one or more data packets, e.g. one or more data packets arriving (at the bridge) and/or stored in one or more (data packet) queues, are delayed. Then a transmission window, indicated by 2) and 3) in FIG. 7, opens and data packets previously received and/or stored in one or more queues are injected/transmitted at time ti.

In addition, at the beginning of the transmission window, a threshold time interval tt, indicated by 2) in FIG. 7, is provided. The threshold time interval tt may correspond to the jitter time interval mentioned. The jitter time interval may compensate for the different deviations of the network stations from a reference clock. This allows one or more data packets, e.g. received previously or stored in one or more (data packet) queues, to travel to their destination in the network N.

One or more data packets being transmitted and/or received after the beginning of the transmission window, i.e. after the threshold time interval tt, may not reach their destination in the network N due to insufficient time remaining in the transmission window, during time period 3), for the one or more data packets to be forwarded (by one or more other network stations such as one or more network bridges). A data packet arriving at a network bridge, in particular from a terminal network device, after the beginning of the transmission window, that is: during time period 3), or after the threshold time interval tt, may thus only be transmitted with increased and/or unknown latency. The one or more data packets may in such a case end up at another network bridge causing congestion. Thus, transmission of the one or more data packets may fail in general. When the transmission window, including time periods 2) and 3), closes again, a data packet arriving (at the bridge) may be forwarded only in the next transmission window and thus transmission of this data packet is delayed again, indicated by 1) in FIG. 7.

It is further proposed to delay transmission of one or more data packets arriving, in particular from a terminal network device at a network bridge, after the threshold time interval tt of a transmission window (but still arriving within said transmission window) and transmit said one or more data packets in the threshold time interval tt of a subsequent transmission window (that is, a transmission window for one or more data packets of the same traffic type as the transmission window in which the data packet arrived). Thus, a defined latency of the one or more data packets may be achieved.

In FIG. 7, the next transmission window RT for one or more data packets that arrived during time period 3) is also shown. This directly subsequent transmission window RT also includes a threshold time interval tt. During this threshold time interval tt, the one or more data packets that arrived during the previous time period, indicated by 1) and 3) in FIG. 7, are transmitted.

Figure 8:
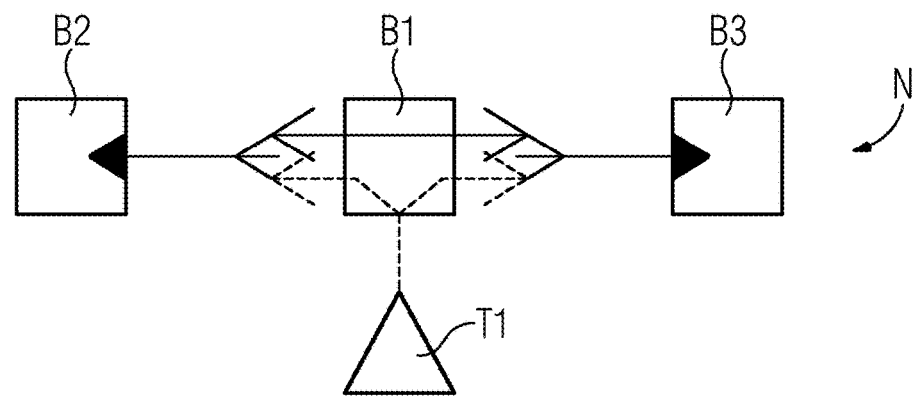
FIG. 8 shows a schematic representation of data transmission in a network, according to one embodiment.

FIG. 8 shows a schematic representation of data packet transmission from a terminal network device T1 and between non-terminal network devices B2, B3. Both transmissions occur via bridge B1. Bridge B1 may be called an edge station or edge bridge or edge device of the network N as it is connected to a terminal device T1. Thus bridge B1 may manage one or more data packets arriving from terminal device T1 and/or from bridges B2 and B3. Management of one or more data packets may be achieved by one or more data packet queues by way of which data packets are stored and subsequently forwarded. As can be seen from FIG. 8, one or more data packets arriving from the terminal device T1 at bridge B1 are forwarded to one or more bridges within the network, in this case bridges B2 and B3. Thus, a multicast transmission of one or more data packets, e.g. via different ports of the bridge B1 may occur. At the same time, data packets may be transmitted within the network N, e.g. from bridge B1 to bridges B2 and B3 or vice versa. Furthermore, the data rate capacity between stations within the network N is usually higher than the data rate capacity between an edge device, such as bridge B1, and a terminal device, such as terminal device T1, of a network N. This may usually be the case and be desired as well. For example, in particular with industrial applications, a terminal device T1 may be a sensor or actor, both of which may be a simple or low-cost device. Furthermore such a terminal device T1 may be a low-power device. In such a case, the terminal device may not have the data rate capacity to transfer data with the same data rate as could be obtained with devices within the network. This may be due to lower processing power of the terminal network device T1 or due to a lower capacity of the transmission cable or the transmission medium itself.

Figure 9:
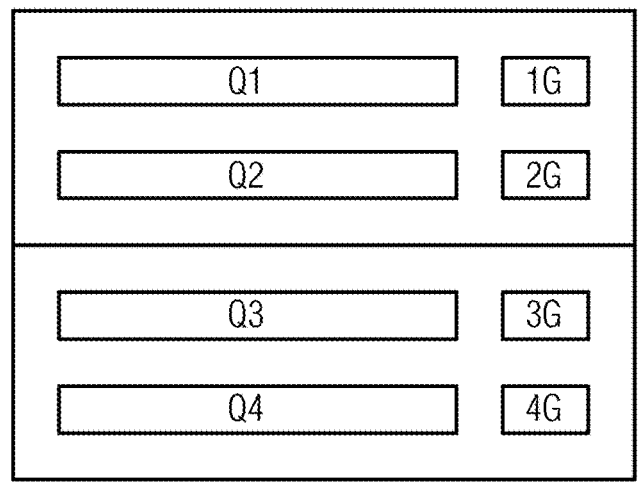
FIG. 9 shows a schematic representation of multiple queues including data packets to be transmitted on the network, according to one embodiment.

In FIG. 9, multiple queues Q1, Q2, Q3, Q4 including data packets to be transmitted on the network N are depicted. The queues Q1, Q2, Q3, Q4 may include one or more data packets, e.g. stored in a memory of a network bridge. Each data packet may have an order number assigned to it, by way of which order number a position of the data packet within the queue is provided. Transmission of one or more data packets from a queue Q1, Q2, Q3, Q4 may be controlled by a respective gate 1G, 2G, 3G, 4G. As mentioned above, each queue may have its own gate by way of which transmission of one or more data packets from the respective queue is controlled. As shown in FIG. 9, queue Q1 is controlled by a gate 1G, and queue Q2 is controlled by a gate 2G. It is proposed to provide a main queue Q1 and an auxiliary queue Q2 for transmission of one or more data packets, e.g. of a traffic type with real time requirements. In the main queue Q1, regular data packets are stored, whereas the auxiliary or second queue Q2 is dedicated for data packets received after the expiration of the threshold time interval tt (but received still within the transmission time interval).

The same may apply to the queues Q3 and Q4 for one or more data packets of another traffic type, e.g. best-effort traffic.

Figure 10:
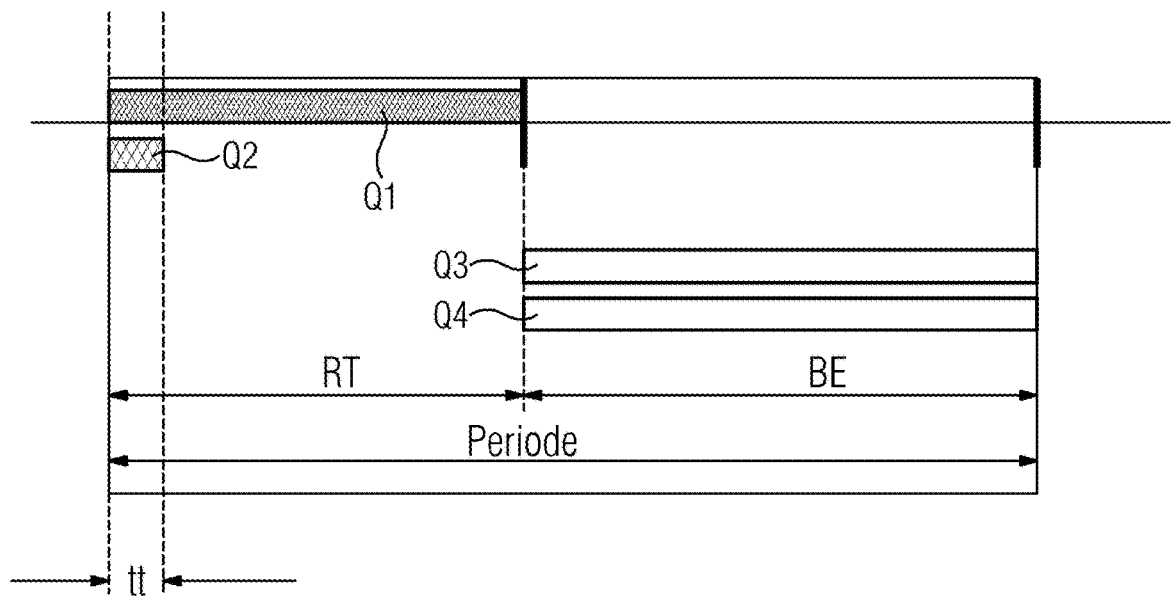
FIG. 10 shows a schematic representation of data transmission on the network, according to one embodiment.

FIG. 10 shows a schematic representation of data transmission of one or more data packets from different data queues Q1, Q2, Q3, Q4 on the network N. One or more data packets from the main and the auxiliary queue may be transmitted within a transmission window, e.g. the RT-transmission window. One or more data packets from the main queue Q1 may be transmitted during the time span of the whole transmission window, i.e. injection of data packets from the main queue can occur at any time during the transmission window RT, that is, also after the expiration of the threshold time interval tt, as shown in FIG. 10. This is due to the fact, that in the main queue one or more data packets may be stored that have been received from another non-terminal network station or network device and that those data packets should not be delayed (as they may be close to their destination). Thus, one or more data packets received from one or more non-terminal network stations or devices may be forwarded within the same transmission window even if they are received after the (expiration of) the threshold time interval tt.

On the other hand, one or more data packets from the auxiliary queue Q2 are only transmitted at the beginning of a transmission window, e.g. transmission window RT, preferably within the threshold time interval tt. Data packets of the main queue and of the auxiliary queue may be transmitted simultaneously on the network, e.g. in different frequency bands, for example due to the higher data rate capacity of transmission lines within the network. However, if such a simultaneous transmission of data packets is not possible data packet transmission from the main queue Q1 and the auxiliary queue Q2 have to be managed. For example, a higher priority may be assigned to the one or more data packets in the auxiliary queue Q2. Hence, only data packets from the auxiliary queue Q2 may be transmitted during the threshold time interval tt (if data packets are stored in the auxiliary queue). If the auxiliary data packet queue Q2 is empty, data packets from the main queue Q1 may be transmitted during the threshold time interval tt. In order to ensure that one or more data packets from the auxiliary queue Q2 are transmitted at the beginning of a transmission window, it is proposed to assign a higher priority to the one or more data packets from the auxiliary queue Q2 than to the one or more data packets of the main queue Q1 when it comes to management of the queues Q1, Q2.

By transmitting one or more data packets from the auxiliary queue Q2 at the beginning of the transmission window, their arrival in due time, i.e. within the transmission window, at their destination can be guaranteed.

During the transmission window for one or more data packets from the main and the auxiliary queue Q1, Q2, transmission of data packets from the queues Q3 and Q4 is delayed. Only when the transmission windows for the transmission of a traffic type of the data packets of queues Q3 and Q4 opens, data packets from those queues may be transmitted. The time schedule described in the above may be repeated for multiple consecutive periods.

Figure 11:
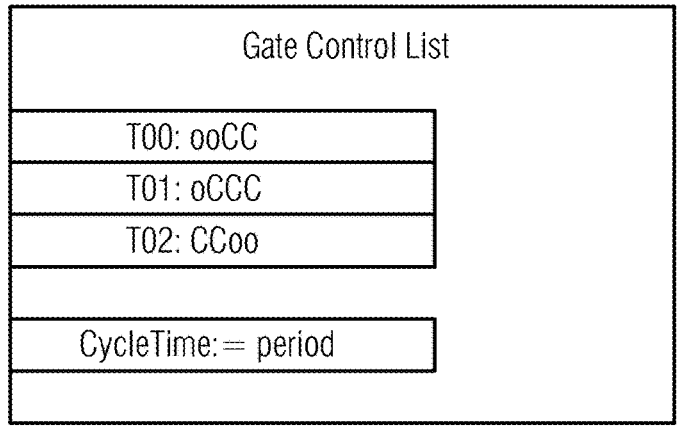
FIG. 11 shows a schematic representation of a scheduling list for gate operation of a bridge, according to one embodiment.

FIG. 11 shows a scheduling list for the operation of a bridge with multiple gates. Such a list may be part of what has become known as a Time Aware Shaper (TAS). The list may be used by a gate driver to open or close the respective gates that allow one or more data packets of a queue to be transmitted on the medium. In the list a "0" represents an open gate whereas a "C" closed gate. The opening and closing of network stations should be synchronized across the whole network in order to allow data transmission during the respective transmission windows. Thus for example at a point in time T00, the gates 1G and 2G are opened so that one or more data packets may be transmitted from the queues Q1 and Q2, whereas at that point in time T00 the gates 3G and 4G are closed. At a subsequent point in time T01, gate 2G closes and only gate 1G stays open for data packet transmission. At a third point in time T02, gate 1G closes as well and gates 3G and 4G open both so that one or more data packets from queues Q3 and Q4 may be transmitted. The time span between T00 and T01 may correspond to the threshold time interval proposed. The time span between T00 and T02 may correspond to the transmission window, e.g. for a traffic type with real time requirements. The time span between T02 and the end of the scheduling period may correspond to a transmission window for another traffic type, e.g. best effort traffic, as shown in FIGS. 9 and 10. The operation of the gates may repeat according to the period of the transmission schedule.

Figure 12A:
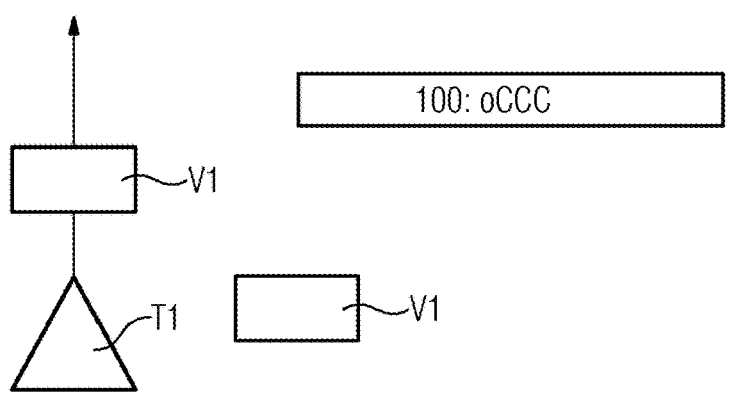
FIGS. 12*a* and 12*b* show a schematic representation of an adaptation of bandwidth usage for data transmission, according to one embodiment.
Figure 12B:
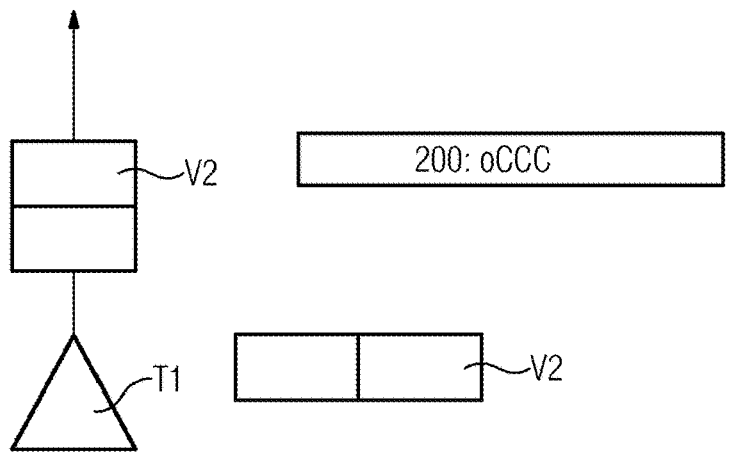

Now turning to FIGS. 12a and 12b, an adaptation of bandwidth usage for data transmission is shown. A terminal network device, such as a sensor or actor or the like, may, e.g. during a first operation mode, transmit a first data volume V1 and may, e.g. during a second operation mode, transmit a second data volume V2, larger than the first data volume V1. In the example of FIGS. 12a and 12b, the amount of data is doubled. The gate control list may be adapted accordingly, e.g. by way of a data packet reservation protocol, such as the stream reservation protocol, that reserves bandwidth for data packet transport in the network. Accordingly, the threshold time interval and/or the transmission window may be adapted to allow transmission of a larger data volume from the terminal network device. A reservation protocol may be employed that ensures that the schedule in the network provides enough bandwidth that is not already used for data packets from other terminal devices in the network. Hence, the transmission window, e.g. the transmission window for real-time traffic, may be increased, e.g. as long as a minimum bandwidth for another transmission window, such as the best-effort transmission window, is available and the period of the time schedule is not changed to support more real-time traffic in the network. As shown in FIGS. 12a and 12b, the time length of a transmission window "200: oCCC" is doubled compared to its previous configuration "100:oCCC", thus allowing one or more data packets to be transmitted within the network during the transmission window, in this case the RT-transmission window for real time traffic transmission.

Figure 13A:
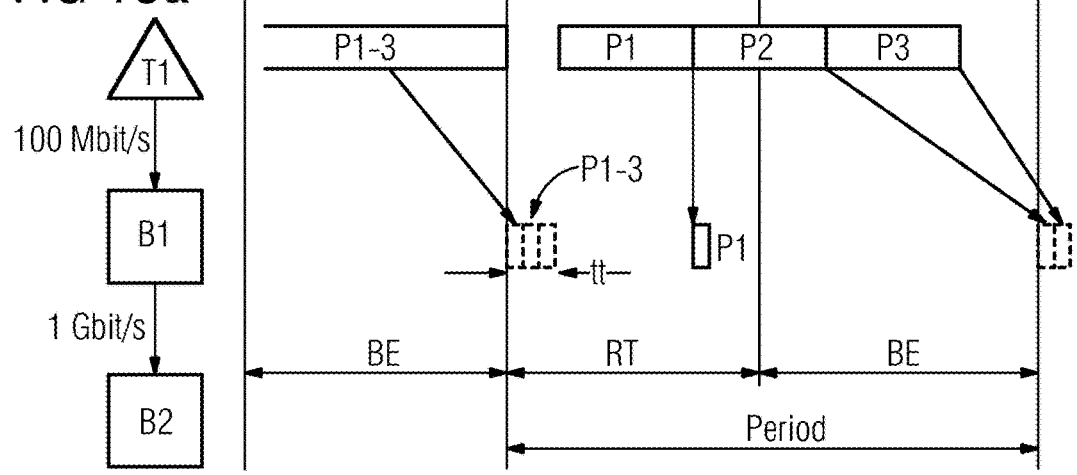
FIGS. 13a, 13b and 13c show a schematic representation of throughput through a network bridge, according to one embodiment.
Figure 13B:
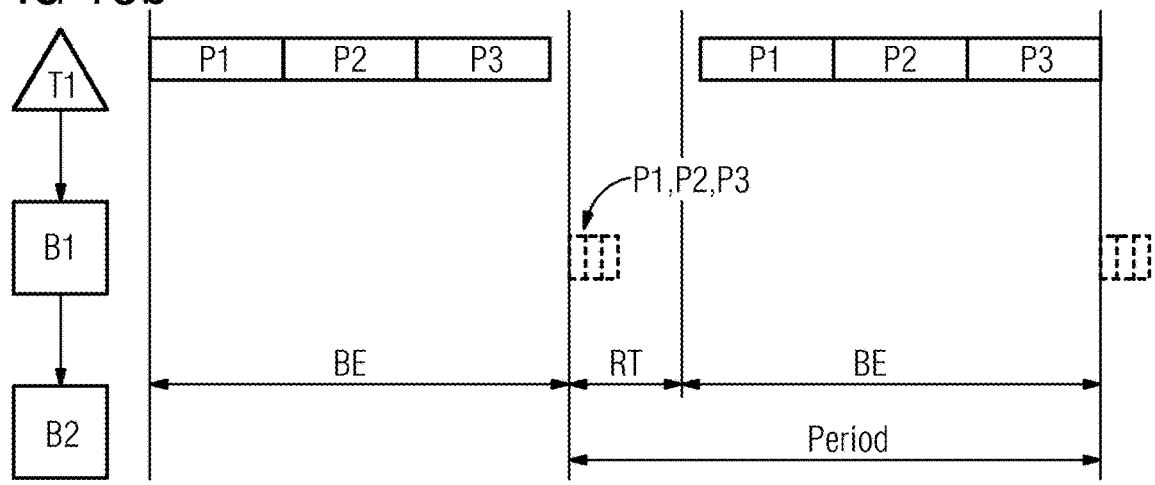
Figure 13C:
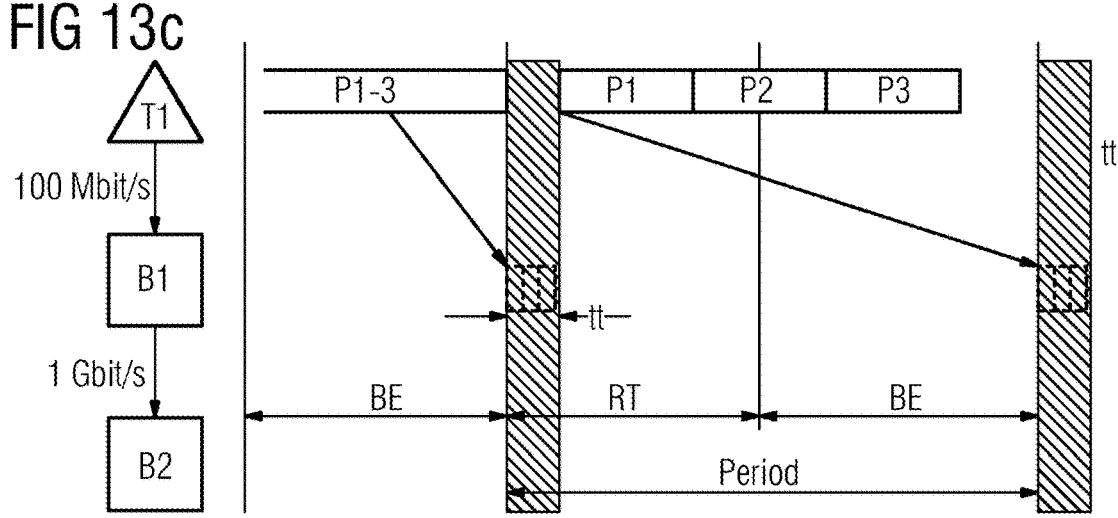

FIGS. 13a, 13b and 13c show a schematic representation of throughput through a network N including bridges B1 and B2. In a synchronized network without an auxiliary data queue in which all data transmission takes place in a coordinated manner, a slower transmission data rate, e.g. the 100 Mbit/s transmission line between T1 and B1 in FIG. 13a, may significantly lower the usable bandwidth for data packets. This is because it may take more time to deliver the data packets from the terminal device to an edge device, e.g. due to a slower transmission line data rate capacity. Additionally, data packets from (unsynchronized) terminal devices may be transmitted outside of the dedicated transmission windows BE, RT for the respective traffic type of the data packets. Due to higher data rate capacity in the network, e.g. the 1 Gbit/s transmission line between bridge B1 and B2, a certain data volume sent from the terminal device T1 can then be transmitted on the network in a smaller transmission window. In order to ensure the transmission of RT Frames at the beginning of the RT period, the size of the RT period shown in FIG. 13a may be reduced to prevent an unintended transmission of the RT frame 3 from terminal device T1 at the Bridge B1 to B2. The reduction is shown in FIG. 13b. This reduction leads to a lower usable amount of RT bandwidth in the faster network transmission.

In contrast thereto, if the edge bridge B1 uses an auxiliary data packet queue, the terminal device T1 is, as shown in FIG. 13c, allowed to make use of its full bandwidth and does not have to consider dedicated transmission windows. The edge device B1 may act as a synchronization unit for the terminal device T1 and may collect (in the auxiliary data queue) all data packets arriving after the threshold time interval tt of a transmission window and may make use of its larger bandwidth when forwarding the data packets received from the terminal device T1 in the threshold time tt of the next, e.g. the directly following, transmission window for the same traffic type.

FIG. 14 shows another exemplary network N in which data packets from three terminal network devices T1, T2, T3 are transmitting data packets to another terminal network device L. The terminal device L, also called end device in the literature, may also be characterized as a listener to a data stream (including one or more data packets) emerging from other terminal devices, e.g. terminal devices T1, T2, T3. Data packet transmission in this case takes place over two network bridges B1 and B2, wherein terminal device T1 is connected to bridge B1 and terminal devices T2 and T3 are connected to bridge B2 and wherein bridge B2 is connected to bridge B1. Finally, terminal device L is connected to bridge B1 as well, via which bridge B1 all data packets are transmitted to terminal device L.

Figure 15:
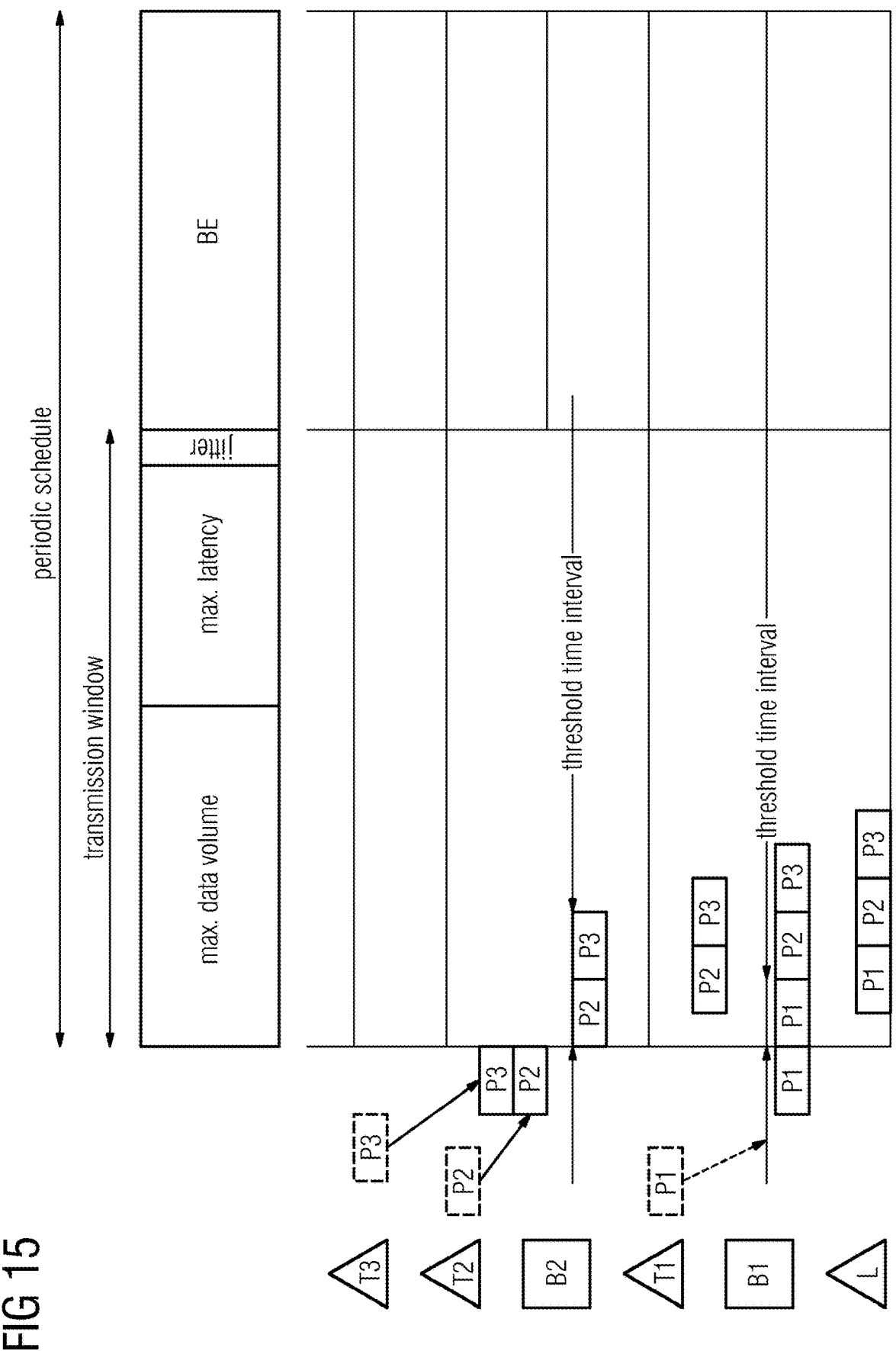
FIG. 15 shows a schematic representation of scheduling data transmission in an exemplary network.

FIG. 15 shows a schematic representation of scheduling data transmission in an exemplary network. In this case, the time schedule presented corresponds to the exemplary network of FIG. 14. Data packets P2 and P3 of terminal network devices T2 and T3, respectively, are received at network bridge B2 and injected in the network consecutively at the beginning of a transmission window. At a later point in time the packets P2, P3 are received at network bridge B1. At the beginning of the transmission window bridge B1 injects, e.g. from its auxiliary data packet queue, a data packet P1 received (at bridge B1 before the beginning of the transmission window) from terminal network device T1 into the network. Data packets P2 and P3 are transmitted in a consecutive order after data packet P1. Terminal network device L then receives all of the data packets P1, P2, P3 within the transmission window.

FIG. 15 further shows different configurations of the threshold time intervals tt of the respective network bridges B1 and B2. The threshold time interval tt is adapted to the data amount received from terminal devices and can be automatically adapted, e.g. by way of a reservation protocol.

Figure 16:
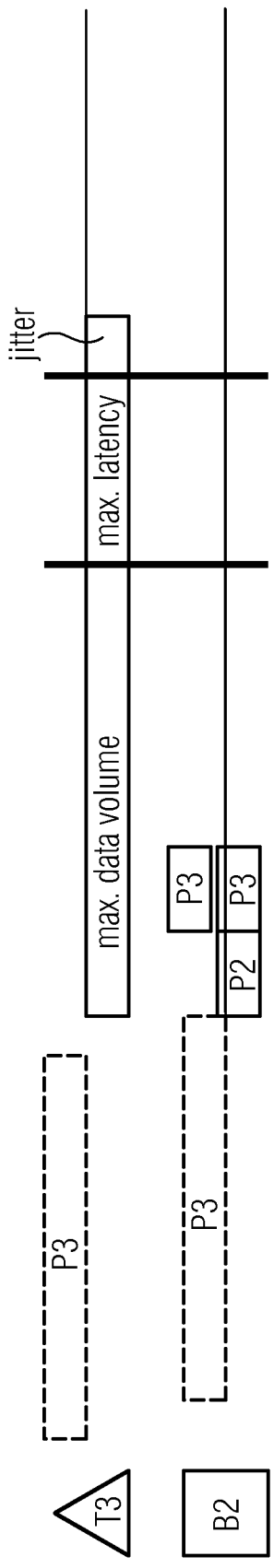
FIG. 16 shows another schematic representation of scheduling data transmission in an exemplary network.
Figure 17:
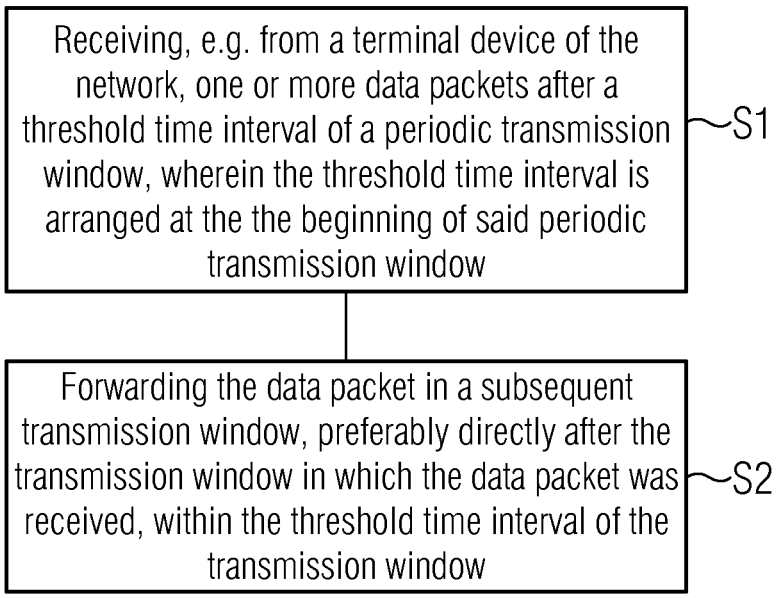
FIG. 17 shows exemplary method acts according to a first embodiment.
Figure 18:
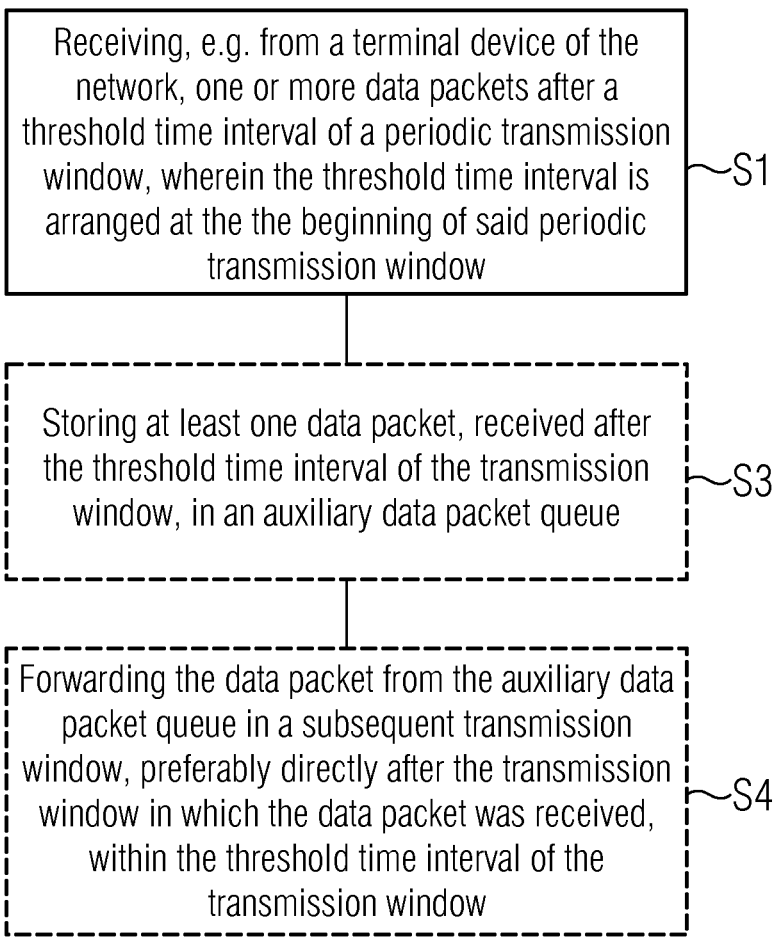
FIG. 18 shows exemplary method acts according to a second embodiment.
Figure 19:
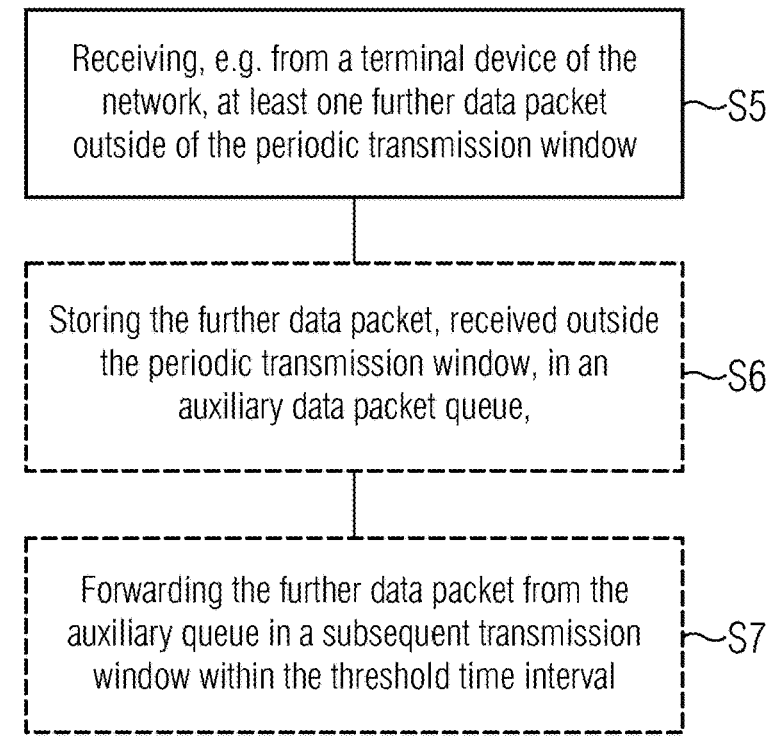
FIG. 19 shows exemplary method acts according to a third embodiment.
Figure 20:
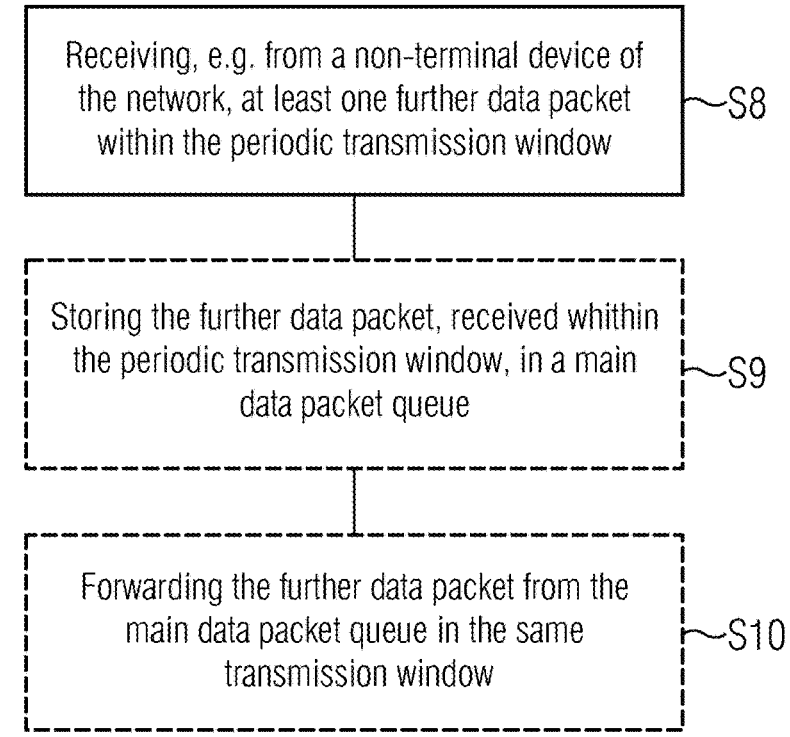
FIG. 20 shows exemplary method acts according to a fourth embodiment.
Figure 21:
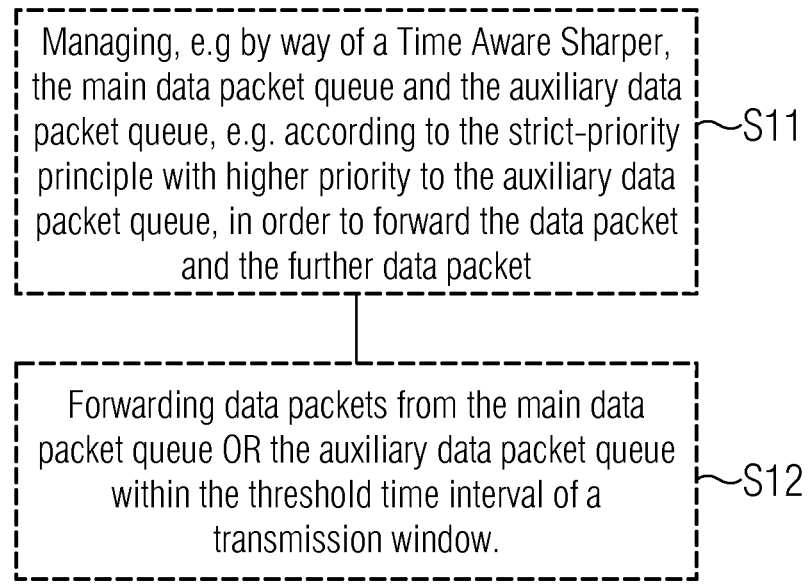
FIG. 21 shows exemplary method acts according to a fifth embodiment.
Figure 22:
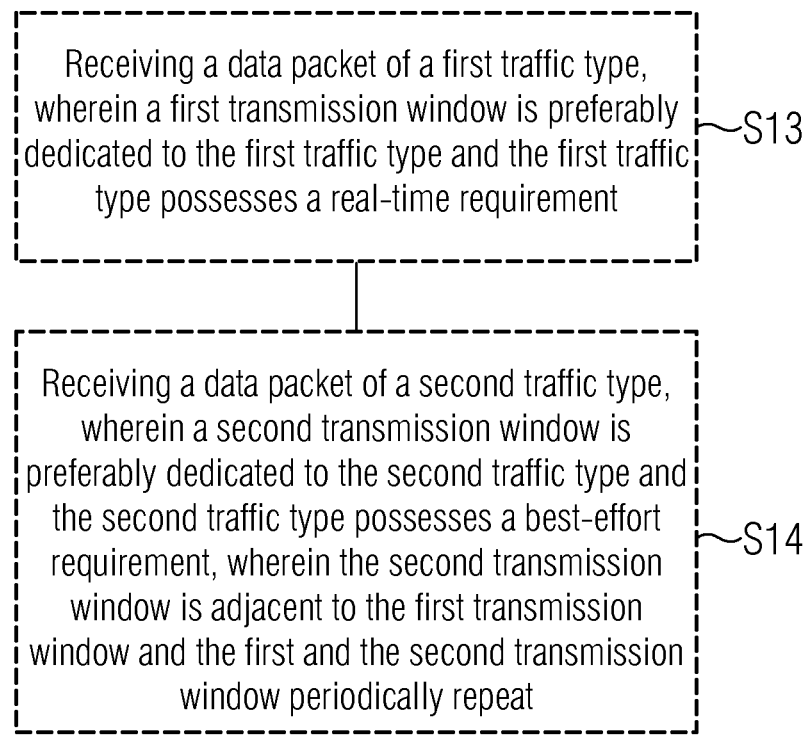
FIG. 22 shows exemplary method acts according to a sixth embodiment.

FIG. 16 shows another schematic representation of scheduling data transmission in an exemplary network. In this case, the network is the same as the one shown in FIG. 16, but with a different data rate (capacity) between terminal device T3 and bridge B2 than the data rate (capacity) between bridges B2 and B1. Thus, the required transmission time of the packet p3 is reduced in the network transmission between bridges B2 and B1 compared to the transmission between terminal device T3 and bridge B2. As can be seen in FIG. 16, the transmission of a data packet, e.g. data packet P3 occupies significantly less bandwidth on the transmission line between bridge 2 and bridge B1 that on transmission line between the terminal device T3 and bridge B2.

FIGS. 17 to 25 show exemplary method acts, e.g. implemented by one or more network stations such as one or more network bridges. After a act S1 of receiving, e.g. from terminal device, one or more data packets after a threshold time interval of a transmission window a act S2 may be performed including and/or initiating: forwarding the one or more data packets received in a subsequent transmission window, wherein the forwarding is performed within the threshold time interval of the subsequent transmission window.

Preferably between the act S1 of receiving the one or more data packet and forwarding the one or more data packets a act S3 of storing the one or more data packets in a an auxiliary data packet queue is performed, followed by a act S4 of forwarding the one or more data packet from the auxiliary data packet queue.

In a act S5, further data packets may be received, e.g. during the transmission interval of another traffic type. These data packets are stored in a act S6 in the auxiliary data packet queue as well and forwarded in a act S7 in the threshold time interval of a subsequent transmission window, preferably a directly following transmission window for the respective traffic type of the data packet received.

Furthermore, in a act S8, data packets may be received by the bridge from other non-terminal devices. Said data packets may be stored in a act S9 in a main data packet queue and may further be forwarded from the main data packet queue in a act S10 within the same transmission window as they were received in.

In a act S11, the data packet stored in the main data packet queue and stored in the auxiliary data packet queue may be managed in order to comply with the traffic requirements of the respective data packets. For example priorities may be assigned to the data packets in order to guarantee appropriate handling as mentioned above. Thus in a Act S12, the data packets may be forwarded according to the order of their priority.

In a act S13, data packets of a first traffic type may be received and, in a act S14, data packets of a second traffic type may be received, e.g. in respective transmission windows.

In a act S15, data packets may be received from an out-of-sync network device, such as a terminal network device and said data packets may be forwarded to a network device or network station that is in sync with the network bridge receiving the one or more out-of-sync data packets.

In a act S17, the one or more data packets may be received via transmission line that has a first data rate capacity and forwarded via a transmission line that has second data rate capacity that is higher than the one of the first transmission line.

In a act S19, the threshold time interval may be adapted, e.g. before setting up data packet transmission of one or more data packets within the network. For example said adaptation may be based on a data packet volume, e.g. the number of bits a data packet carries.

Figure 26:
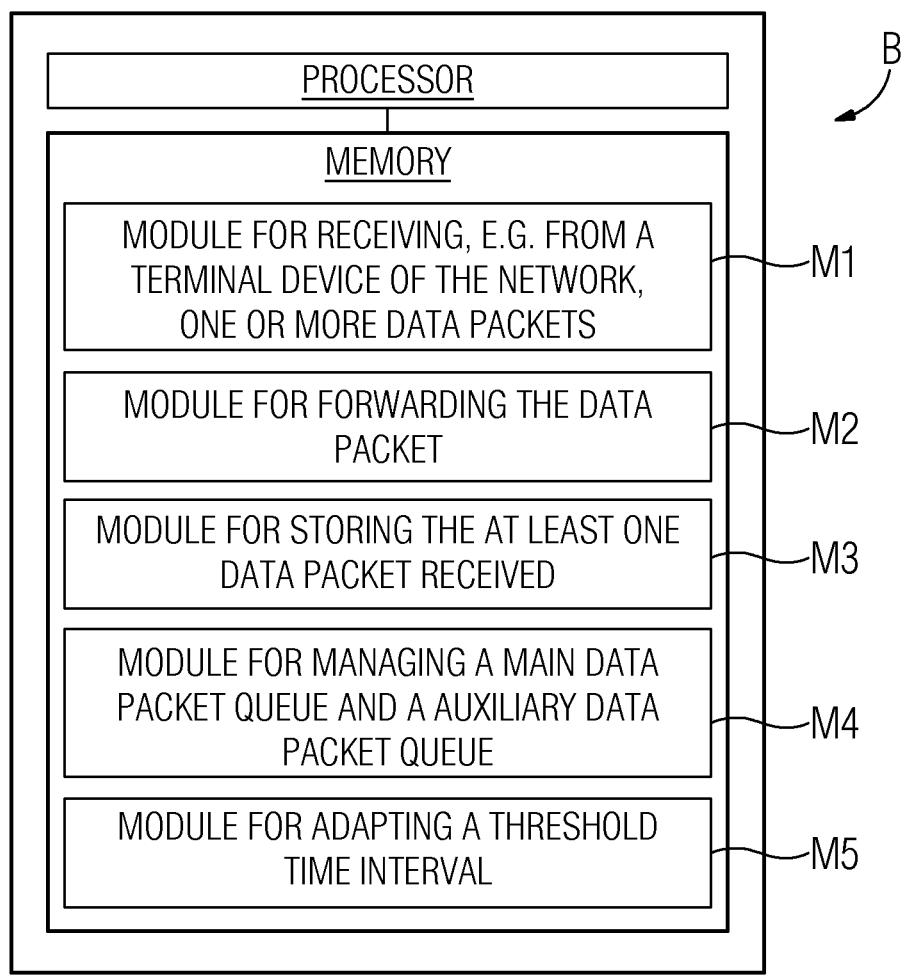
FIG. 26 shows an exemplary structure of a network bridge.

FIG. 26 shows an exemplary structure of a network bridge. A bridge may have one or more, i.e. multiple ports, for receiving and/or transmitting (forwarding) data packets from/to one or more other network stations. A physical topology of a bridge is depicted in FIG. 8-1 of IEEE Std 802.1Q-2014 (Approved 3 November 2014).

For example, traffic types such as Best Effort, Background, Excellent Effort, Critical Applications, Voice, Video, Network Control, Internetwork Control are known from, e.g. Table I-1 and Table I-2 of IEEE Std 802.1Q-2014 (Approved 3 Nov. 2014).

It should be understood that a data packet may be any unit of data transmission, e.g. a data packet may be a frame on an IEEE 802 Local Area Network (LAN) that conveys a Media Access Control (MAC) Protocol Data Unit (MPDU).

Accordingly, a bridge may be operative to relay and or filter data packets, such as frames. Furthermore, a bridge may have additional functionality like maintaining the rules required to perform filtering and relaying.

In order to carry out the method acts as described in the above in connection with FIGS. 1 to 25, the bridge B may include one or more modules. For example the bridge B may include a module M1 for receiving one or more data packets. Further on the bridge may include a module M2 for forwarding one or more data packets. The bridge may further include a module M3 for storing the one or more data packets received. The bridge B may further include a module M4 for managing the main data packet queue and the auxiliary data packet queue. The bridge B may also include a module M5 for adapting the threshold time interval. The bridge may further include module for performing any one of the method acts mentioned in the above, in particular for performing the method acts shown in FIGS. 17 to 25. Said modules may be stored in a memory of the bridge B and may be executed by a processor of said bridge B.

In particular, an industrial automation system typically includes an industrial communication network which in turn includes a plurality of automation devices linked to each other and serves as part of a production or process automation for control or regulation of plant, machinery or equipment. Due to time-critical conditions in automated means of industrial automation systems technical systems in industrial communication networks for communication between automation devices mainly real-time communication protocols such as Profinet, Profibus or Real-Time Ethernet, are used. Thus said one or more bridges B, as described in the above, may form an industrial communication network and may be operative to be employed in an industrial application, in particular an automation system.

The invention claimed is:

1. A method of synchronization of data packet transmission in a network, the method comprising:
receiving, from a terminal device of the network by a first non-terminal device of the network, one or more data packets after a threshold time interval of a periodic transmission window, wherein the threshold time interval is arranged at the beginning of said periodic transmission window, and
forwarding, by the first non-terminal device of the network to a second non-terminal device of the network, the one or more data packets in a subsequent transmission window within the threshold time interval of the subsequent transmission window;
wherein the receiving further comprises:
receiving the one or more data packets from the terminal device of the network, the terminal device being out-of-sync with respect to data transmission of the first and second non-terminal devices of the network, and
wherein the forwarding further comprises forwarding the data packet to the second non-terminal device of the network, the second non-terminal device being in-sync with respect to data transmission of the first non-terminal device of the network.

2. The method according to claim 1, further comprising:
storing the at least one data packet, received after the threshold time interval of the transmission window, in an auxiliary data packet queue, and
forwarding the data packet from the auxiliary data packet queue in a subsequent transmission window within the threshold time interval of the transmission window.

3. The method according to claim 2, wherein the forwarding comprises forwarding in the subsequent transmission window directly after the transmission window in which the data packet was received.

4. The method according to claim 1, further comprising:
receiving, from the terminal device of the network, at least one further data packet outside of the periodic transmission window, and
storing the further data packet received outside of the periodic transmission window in an auxiliary data packet queue, and forwarding the further data packet from the auxiliary queue in a subsequent transmission window within the threshold time interval.

5. The method according to claim 1, further comprising:
receiving, from a third non-terminal device of the network, at least one further data packet within the periodic transmission window, and
storing the further data packet received within the periodic transmission window in a main data packet queue, and
forwarding the further data packet from the main data packet queue in the same transmission window in which the further data packet was received.

6. The method according to claim 5, further comprising:
managing the main data packet queue and the auxiliary data packet queue-according to the strict-priority principle with higher priority to the auxiliary data packet queue in order to forward the data packet and the further data packet.

7. The method according to claim 5, further comprising:
forwarding data packets from the main data packet queue or the auxiliary data packet queue within the threshold time interval of a transmission window.

8. The method according to claim 5, wherein the one or more data packets are forwarded within the threshold time interval of the subsequent transmission window directly after the transmission window in which the one or more data packets were received.

9. The method according to claim 1, wherein the receiving comprises:
receiving the one or more data packets of a first traffic type, wherein a first transmission window is dedicated to the first traffic type and the first traffic type possesses a real-time requirement.

10. The method according to claim 9, wherein the receiving further comprises:
receiving a data packet of a second traffic type, wherein a second transmission window is dedicated to the second traffic type and the second traffic type possesses a best-effort requirement, wherein the second transmission window is adjacent to the first transmission window and the first and the second transmission window periodically repeat.

11. The method according to claim 1, further comprising:
receiving the one or more data packets via a first transmission line with a first data rate capacity, and
forwarding the one or more data packets via a second transmission line with a second data rate capacity,
wherein the first data rate capacity is lower than the second data rate capacity.

12. The method according to claim 1, further comprising:
adapting the threshold time interval based on an expected data packet volume to be forwarded.

13. The method according to claim 12, wherein the adapting comprises adapting when configuring a bridge for transmission of a data stream from a stream source to a stream receiver.

14. The method according to claim 1, further comprising:
transmitting said one or more data packets in the threshold time interval of the subsequent transmission window, wherein the subsequent transmission window is a transmission window of the same traffic type as the transmission window in which the one or more data packets arrived.

15. A network bridge comprising:
a processor;
a memory configured to store modules executable by the processor, the modules comprising:
a first module to receive, from a terminal device of the network, one or more data packets after a threshold time interval of a periodic transmission window, wherein the threshold time interval is arranged at the beginning of said periodic transmission window, and
a second module to forward the one or more data packets in a subsequent transmission window within the threshold time interval of the subsequent transmission window;
wherein the first module is configured to receive the one or more data packets via a first transmission line with a first data rate capacity, and
wherein the second module is configured to forward the one or more data packets via a second transmission line with a second data rate capacity, wherein the first data rate capacity is lower than the second data rate capacity.

16. An industrial communication network comprising;
a network bridge being a non-terminal device of the network and comprising a processor and a memory configured to store modules executable by the processor, the modules comprising a first module to receive, from a terminal device of the network, one or more data packets after a threshold time interval of a periodic transmission window, wherein the threshold time interval is arranged at the beginning of said periodic transmission window, and a second module to forward, by the non-terminal device of the network to a another non-terminal device of the network, the one or more data packets in a subsequent transmission window within the threshold time interval of the subsequent transmission window;
wherein the processor is configured to adapt the threshold time interval based on an expected data packet volume to be forwarded.

17. The industrial network according to claim 16, wherein the network bridge comprises a first bridge, and further comprising a second bridge, wherein the first bridge is configured with a first threshold time interval as the threshold time interval, and the second bridge is configured with a second threshold time interval, and wherein the first and the second threshold time intervals have different lengths.

18. The industrial communication network according to claim 16, wherein the processor is configured to adapt when configuring the network bridge for transmission of a data stream from a stream source to a stream receiver.

* * * * *